Dec. 21, 1965 M. JACOBY 3,225,337

POSITIONING MECHANISM

Filed April 20, 1960 6 Sheets-Sheet 1

INVENTOR.
MARVIN JACOBY

BY Fred Fisher

ATTORNEY

INVENTOR.
MARVIN JACOBY
BY
Fred Fisher
ATTORNEY

INVENTOR.
MARVIN JACOBY
BY
*[signature]*
ATTORNEY

POSITIONING MECHANISM

Filed April 20, 1960

INVENTOR.
MARVIN JACOBY

BY

[signature]
ATTORNEY

Dec. 21, 1965 M. JACOBY 3,225,337

POSITIONING MECHANISM

Filed April 20, 1960 6 Sheets-Sheet 5

INVENTOR.
MARVIN JACOBY
BY
Fred Fisher
ATTORNEY

Dec. 21, 1965 M. JACOBY 3,225,337

POSITIONING MECHANISM

Filed April 20, 1960 6 Sheets-Sheet 6

INVENTOR.
MARVIN JACOBY

BY Fred Fisher

ATTORNEY

United States Patent Office 3,225,337 Patented Dec. 21, 1965

3,225,337
POSITIONING MECHANISM
Marvin Jacoby, 7032 Lafayette Ave., Fort Washington, Pa.
Filed Apr. 20, 1960, Ser. No. 23,529
9 Claims. (Cl. 340—174.1)

This invention relates to positioning mechanisms and, in particular, relates to addressable mechanisms for locating desired tracks on desired magnetic drums.

In modern data handling systems, vast amounts of storage are required for handling the growing accumulation of data necessary for modern business practices. For example, various commercial and industrial problems and practices, such as airline reservations, payroll information, insurance statistics, military data handling, census information, and the like, require the accumulation of vast amounts of data. This data is required to be stored. In one form of storage, this data may be stored on a plurality of magnetic drums, wherein each magnetic drum has a plurality of magnetic tracks about its periphery, whereby information is encoded on the tracks in the form of magnetizable impulses. The data storage handling capabilities of such a system can be increased by increasing the number of drums, by increasing the diameter of the drums, by increasing the length of the drums, and/or by increasing the density of storage upon the drums.

Each additional drum or drum unit requires an increase in cost to the system. It has been found that twenty drums, or ten drum units of two drums each, are suitable for a number of applications. For mechanical reasons, there is an optimum maximum length and optimum maximum diameter for the drum. Suitable dimensions for a drum include a length of 44 inches and a diameter of 24 inches.

In view of the practical limitations upon the size of the drums and upon the number of the drums for a storage system, it becomes apparent that the only practical way for increasing storage is to increase the density of information on a drum. One means of increasing the density of storage is to space the tracks on the drum close together, so that track densities can be obtained in the order of magnitude of fifty tracks per inch, providing a mean track spacing of 0.020 inch.

In accordance with this invention, means are described for selecting one of a plurality (e.g. ten) of drum units and for selecting one of two drums of that unit, and means are described for positioning a magnetic head to the proper track of the selected drum. As stated above, one track is merely 0.020 inch from an adjacent track. It is necessary, therefore, that an extremely accurate positioning means be provided in order to overcome the high track density upon the drum.

It is an object of this invention to provide a novel positioning mechanism.

It is another object of this invention to provide a novel magnetic head positioning mechanism for a magnetic drum.

It is a further object of this invention to provide a novel addressable positioning mechanism with vernier accuracy.

It is a further object of this invention to provide a novel system for addressing a selected track of a selected drum of a selected drum unit, whereby, upon proper positioning, the system provides a "unit ready" signal.

Still another object of this invention is to provide a novel addressable track selecting mechanism.

In accordance with this invention, there is provided a plurality of drum units, and control circuitry. Each drum unit comprises a pair of rotatable magnetic drums mounted in an over-under relationship, each having a plurality of tracks about its periphery; and a positioning mechanism between the drums including a carriage for carrying a pair of magnetic heads. The pair of magnetic heads are designed to float over the surface of their respective drums without contacting the drum surface. The heads "fly," so to speak, on a thin film of air carried by the drum surfaces due to the high speed of rotation of the drums. A pawl is carried by the carriage for engagement between the saw shaped teeth of a rack. The rack runs parallel to the length of the drums and has a tooth for each group of, say, twenty, tracks on the drum. Movement of the carriage to a given tooth on the track selects a group of tracks, and movement of the rack to, say one of twenty positions corresponding to the twenty tracks of the group, selects a single track within the group. The pawl is electrically actuated for engagement with said rack and is mechanically retractable by the incline of a tooth on the rack. A force ordinarily is applied to the carriage to engage the pawl against the face of a tooth on the rack. The control circuit provides a drum unit selector signal for selecting which one of a plurality of drum units is to be addressed. The control circuit sends the desired drum unit an address. The address is in the form of a binary coded electrical signal formed by a number of binary bits appearing simultaneously on a plurality of lines indicative of a desired track for engagement with the head. A separate signal by the control circuit selects which one of the two drums of the unit is addressed by means of switching circuits. The binary coded signal representing the address consists of two portions: one portion, in effect, represents the address by the number of teeth that the carriage is to move with respect to the rack; the other portion of the address represents the distance that a rack is to move in vernier engagement with the carriage. In other words, assuming a drum has two thousand tracks about its periphery and a rack has one hundred teeth thereon, one portion of the address designates where the carriage should move with respect to the one hundred teeth, and the other portion of the address directs the distance that the rack should move within one of twenty incremental distances within the pitch of a tooth.

Means are responsive to one portion of the address for moving the rack. Means are responsive to a change of the remaining portion of the address for applying a force to the carriage in a direction away from the face of the tooth in order to mechanically retract the pawl. The carriage is moved approximately to the desired track in response to the address, at which time the pawl becomes engaged between a pair of teeth on the rack and a force is applied to bias the pawl of the carriage against the face of a tooth on the rack so that the head is in engagement with the desired track. At this time, a "unit ready" signal is generated by the drum unit to the control circuit.

The novel features of this invention and other objects and advantages thereof, together with its organization and method of operation, will become more apparent from the following description, when read in connection with the accompanying drawings, in which:

FIG. 1 together with FIG. 1*a* is a block diagram of an embodiment of this invention;

Figure 1:
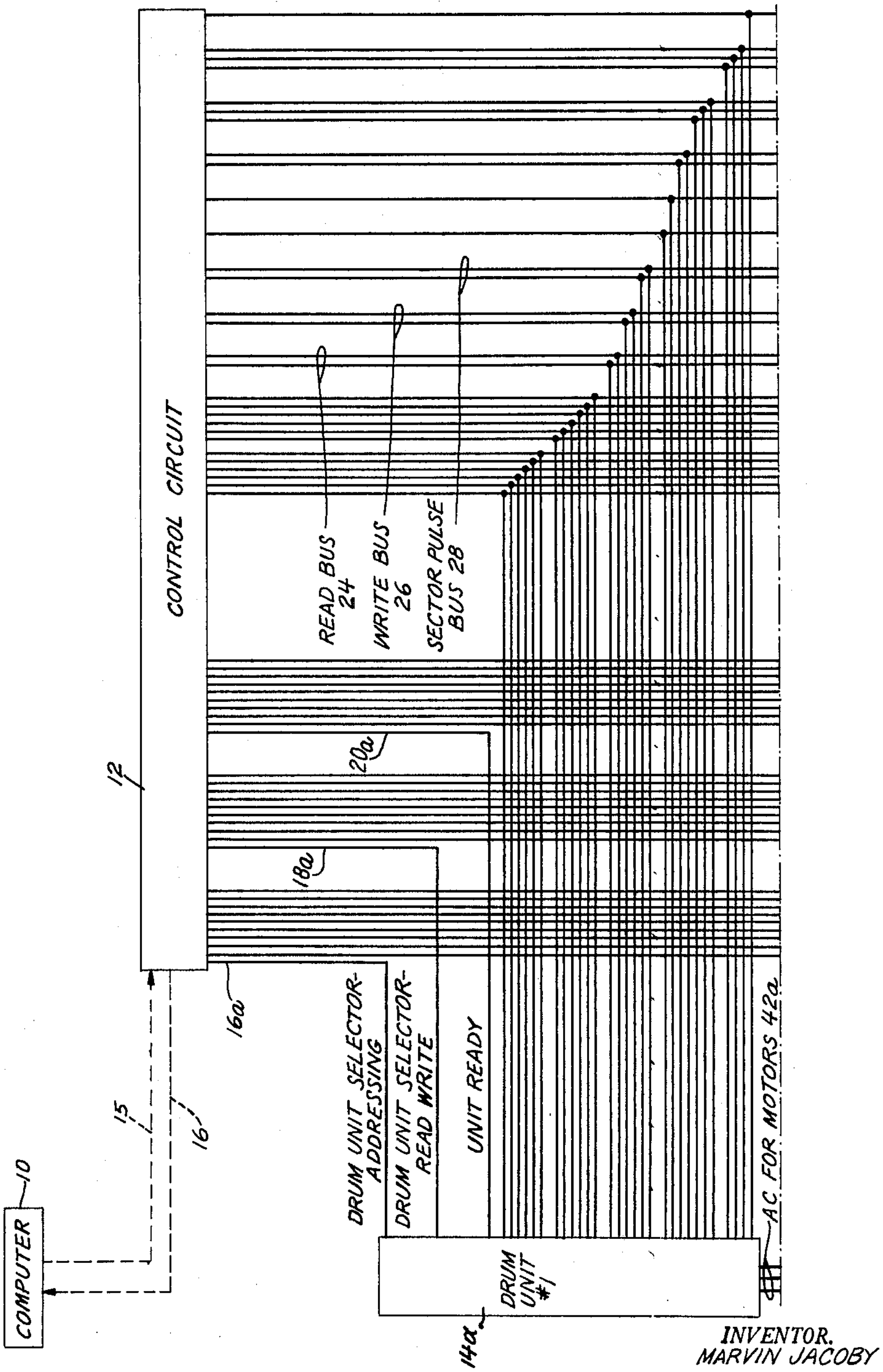
Figure 1A:
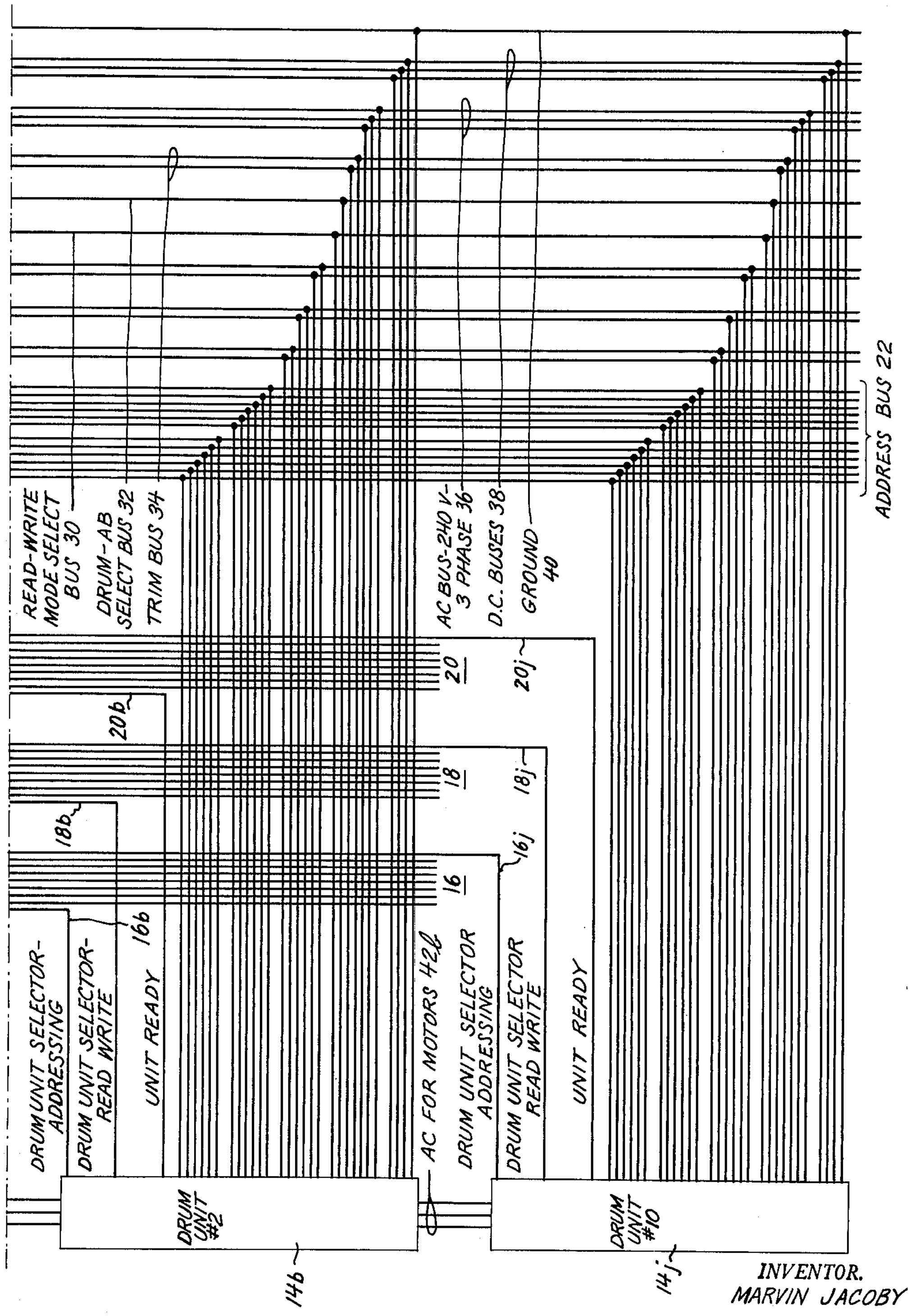
Figure 2:
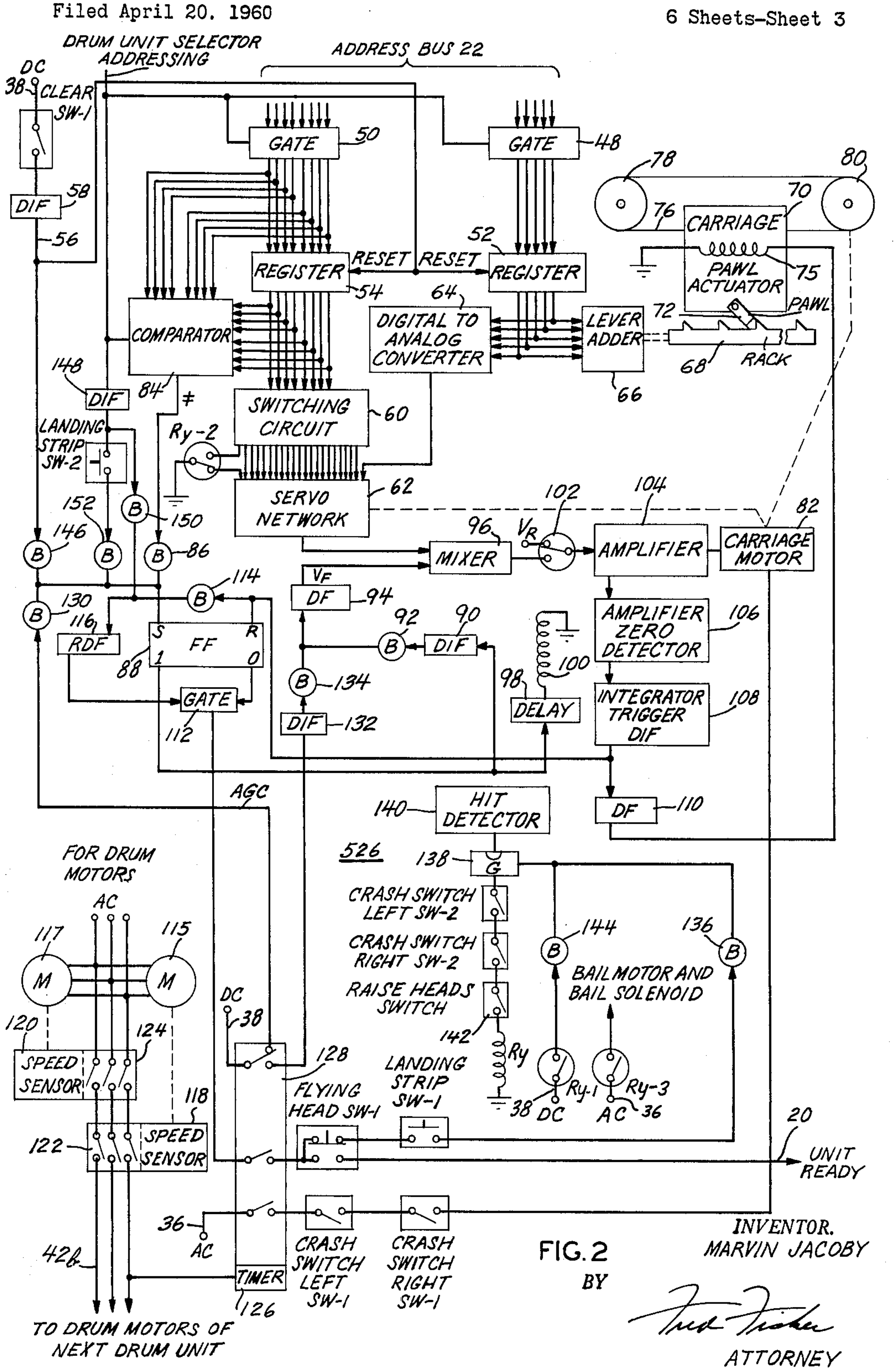
FIG. 2 is a detailed block diagram showing most of the circuitry of a drum unit shown in FIG. 1.

Referring to FIGS. 1 and 1*a*, there is shown a computer 10 and a control circuit 12. Dotted lines 15 connect various input and output signals to and from the computer 10 and control circuit 12. Ten drum units 14*a*, 14*b*, . . . 14*j* are coupled to the control circuit 12 by various leads in order to receive and send various signals. As described hereinbelow, the control circuit 12 provides a "drum unit selector-addressing" signal on one of the lines 16*a*, 16*b*, . . . 16*j* to the corresponding one of the drum units 14*a*, 14*b*, . . . 14*j*. A signal upon one of these lines 16 enables the proper addressing of one of the units 14. In similar fashion, a "drum unit selector-read write" signal from the control circuit 12 along one of the lines 18*a*, 18*b*, . . . 18*j* to the corresponding drum units 14*a*, 14*b*, . . . 14*j* selects the desired drum unit 14 for reading and writing application. Upon the completion of an address, and upon the selected drum unit being ready for reading and writing operations, the selected drum unit 14*a*, 14*b*, . . . 14*j* provides an output signal on a corresponding "unit ready" line 20*a*, 20*b*, . . . 20*j*. The control circuit 12 further provides a plurality of lines (an address bus 22) to each of the drum units, 14*a*, 14*b*, . . . 14*j*. The address bus 22 can be twelve lines as shown in FIG. 1, thirteen lines as shown in FIG. 2, or other appropriate number of lines for carrying electrically coded binary signals. The control circuit 12 further provides additional lines to the drum units 14*a*, 14*b*, . . . 14*j*. They are as follows: the read bus 24, write bus 26, sector pulse bus 28, read-write mode select bus 30, drum A–B select bus 32, trim bus 34, A.C. bus 36, D.C. bus 38, and ground bus 40. In addition, lines 42*b* couple the first drum unit 14*a* to the second drum unit 14*b* for providing alternating current to the motors in the second drum unit 14*c*. Iteratively, lines 42*b* are provided from the second drum unit to the third drum unit, lines from the third to the fourth drum unit, etc., for connecting alternating current to motors of subsequent drum units.

As illustrated in FIG. 1, the control circuit 12, which is coupled to receive and send information from the computer 10 via the lines 15, addresses a selected drum unit 14*a* to 14*j* via a drum unit addressing line 16*a* to 16*j*. The drum A–B select bus 32 selects the desired drum of the drum unit and a particular track address is transmitted via the address bus 22 to the drum unit. The drum unit, when ready, provides a signal upon its corresponding "unit ready" line 20*a* to 20*j*. Subsequently, information can be written to or read from the particular drum unit 14 via the write or read busses 26, 24. The operation of the system becomes more apparent from the detailed description of each of the drum units as described hereinafter.

Figure 3:
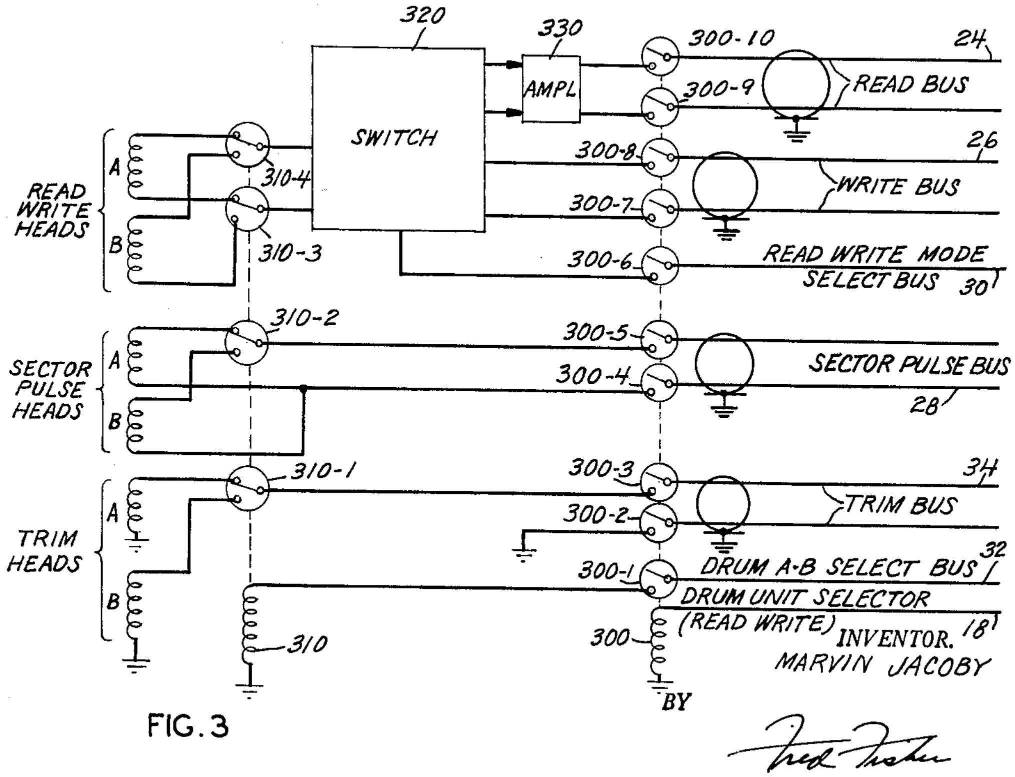
FIG. 3 is a schematic diagram of the head switching circuitry which is used in each of the drum units of FIG. 1.

Each of the drum units 14*a*, 14*b*, . . . 14*j*, which are shown in FIG. 1, is described in greater detail below. Each drum unit contains a pair of juxtaposed drums 44, 46, shown in FIG. 5. In addition, the circuitry shown in FIGS. 2 and 3 are contained in each of the drum units.

Referring now to FIG. 2, there is shown a pair of gates 48, 50 which receive the address from the address bus 22. In accordance with one embodiment of the invention, the address can take the form of three decimal digits ranging from 000 to 999 to represent a particular track of the one thousand tracks on the drum. Each decimal digit would be represented in a binary coded form, which form can be either straight binary coded decimal or binary coded decimal excess three, as desired. Normally, assuming that the code is represented as a straight binary coded decimal, the representation for the track designated 473 would appear on the twelve address line in binary code as 0100 0111 0011. One portion of the address, for example, the most significant digits 4 and 7 is coupled to the gate 50; the remaining portion of the address is coupled to the gate 48.

In accordance with the embodiment shown in FIG. 2, the address can take the form of two decimal digits in combination with one vigesimal digit. The range of digits, from 00-0 to 99–19 would represent two thousand tracks on the drum. The digits are represented in binary coded form. A decimal digit is transmitted on four lines in binary coded form and a vigesimal digit is transmitted on five lines in binary form. Thus, the representation for the track designated 83–17 would appear on the thirteen address line as 1000 0011 10001. Eight lines of the address bus 22 are coupled to the gate 50; five lines of the address are coupled to the gate 48. The five lines coupled to the gate 48 comprise the least significant digit (the vigesimal digit) of the address; the eight lines to the gate 50 comprise the most significant digits (the decimal digits) of the address.

It will be appreciated that other codes or additional or less digits can be used with a suitable modification. For example, quinary, decimal, duodecimal, or vigesimal digits, alone or in combination, can be used with either or both gates 48 and 50. However, the most significant digit or digits of the address are coupled to the gate 50; the least significant digit or digits is coupled to the gate 48. Thus, this principle applies both when the track is expressed in terms of a uniform radix, as with the three decimal digits described earlier, and when the track is expressed in terms of a mixed radix, as more recently described.

An enabling signal from the drum unit selector-addressing line 16 is applied to each of the gates 48, 50. Each of the gates 48, 50 provides output signals corresponding to their respective input signals upon the presence of an enabling signal from the drum unit selector-addressing line 16. The outputs of the gates 48 are coupled to a register 52 such as a conventional flip-flop register. The register 52 provides a coded output signal which corresponds to the signal read into the register. The outputs of the gate 50 are coupled to a register 54, similar to the register 52, and which sets the register 54 in accordance with the signals provided at the outputs of the gate 50. Both the registers 52 and 54 are adapted to be reset by a "clear" signal on the line 56, which signal can be generated by the closing of the switch CLEAR SW–1 to complete a circuit from the direct current bus 38 through a differentiator 58 to provide a "clear" pulse on the line 56. The output of the register 54, which comprises eight leads containing binary information, is connected to a switching circuit 60 which switches, by means of relays or other switching devices, the binary information present at its input to an enabling level on one line of each of the two sets of ten lines at its output. The switching circuit 60, in other words, converts the binary coded data at its input into decimal coded data at its output. The switching circuit 60 provides an output on its output lines corresponding to its input signal only upon the application of a grounding lead which is obtained by having one lead from the switching circuit 60 coupled to a normally open contact of a relay pole Ry–2, which pole has its arm connected to a point of reference potential, such as ground. The outputs of the switching circuit 60 are connected to a servo network 62. In addition, the normally closed contact of the relay pole Ry–2 (i.e. that contact which is closed when the relay pole Ry is not energized) is connected to the servo network 62. The output of the least significant digits register 52 is coupled to a digital-to-analog converter 64. The digital-to-analog converter 64 converts the binary coded information present at its input into an analog signal at its output, the output being coupled to the servo network 62. The output of the register 52 is also coupled to a lever adder 66 which acts as an electrical to mechanical transducer for translating the electrical signal present at its input into mechanical motion at its output to actuate a rack 68. A carriage 70, which carries the heads 73, 74 (shown in FIG. 5), has associated therewith a pawl 72. The pawl 72 is mechanically retractable by sliding it up the incline of a tooth of the rack 68 and electrically actuatable to drop into engagement with this rack by energizing a pawl actuator or pawl coil 75. The carriage 70 is moved by means of a drive cable 76 which is carried by a pair of pulleys 78, 80 and driven by a reversible carriage motor 82. The movement of the carriage 70 along the distance between the two pulleys 78, 80 moves the associated heads 73, 74 along the lengths of the drums 44, 46. The carriage motor 82 is mechanically coupled to the servo network 62 to operate an electrical potentiometer therein (not shown). Therefore, the servo network 62 has two sets of signals present at its inputs: first, a signal from the carriage motor which indicates where the carriage is located; second, an electrical signal to indicate the desired carriage location. The servo network 62 provides an output when there is an inequality at its inputs. The servo network 62 operates in a normal manner whereby the characteristic of the output signal (such as magnitude, polarity, or phase) is such as to direct the carriage motor 82 to search for the desired location.

The register 54, as most conventional registers, requires a finite time for the register to change its state upon the application of subsequent input signals applied thereto. In other words, the output from the register 54 is delayed from its input signal.

The output of the gate 50, and the output of the register 54 which instantly is producing an output signal corresponding to the previous signal applied thereto, are coupled to the inputs of a comparator 84 which receives an enabling signal from the drum unit selector-addressing line 16. The comparator 84 provides an output at its output terminal in coincidence with the enabling signal and unequal signals at its input terminals. The output from the comparator 84 is coupled via a buffer 86 (which can form part of an isolating or "or" circuit) to the set terminal of a flip-flop 88.

The flip-flop 88 can be a conventional bistable circuit such as the Eccles-Jordan type. The flip-flop 88, upon being "set" by an enabling signal at the set terminal S, provides an enabling signal at its "1" output terminal and continues to provide an enabling signal at that output terminal "1" until an enabling signal is subsequently applied to the "reset" terminal R of the flip-flop 88, at which time the flip-flop removes the enabling signal from its "1" terminal and provides an enabling signal at its "0" terminal. The "1" terminal of the flip-flop 88 is coupled via a differentiator 90, through a buffer 92, to the input of a delay-flop 94. The set output terminal of the delay-flop 94 is coupled to one terminal of a mixer 96. The delay-flop 94, also termed a "one-shot" or monostable multivibrator, provides an output at its set output terminal for a fixed duration upon the application of an enabling signal present at its input terminal. The output of the servo network 62 is coupled to a second terminal of the mixer 96. The mixer 96 combines the two signals present at its input to provide an output signal therefrom. The mixer 96 can be a resistance adder, a multi-grid electron tube, or other suitable combining network.

The "1" output terminal of the flip-flop 88 is further coupled through a delay circuit 98 to one terminal of a relay coil 100 which has its other terminal coupled to a point of reference potential, such as ground. The relay coil 100, when energized, actuates a relay pole 102. The output of the mixer 96 is coupled to the normally open contact of the relay pole 102. The arm of the relay pole

102 is coupled to an amplifier 104 which has an output connected to operate the carriage motor 82. The normally closed contact of the relay pole 102 is coupled to receive a potential $V_R$ to provide a reverse torque to the carriage motor 82 to cause a force to be applied to the carriage 70 towards the right, as shown in FIG. 2. The delay-flop 94 provides an output signal $V_F$ at its output when the delay-flop 94 is set. The voltage $V_F$ has such a characteristic as to provide a forward torque to the carriage motor 82 to cause the carriage 70 to have a force applied thereto to the left. The carriage motor 82 and amplifier 104 can be either A.C. or D.C. operated: when the motor and amplifier are D.C. operated, the voltages $V_R$ and $V_F$ are of opposite polarities; when the carriage motor and amplifier are A.C. operated, the voltages $V_R$ and $V_F$ are of opposite phases. The output of the amplifier 104 is coupled to a rectifier and zero detector 106. The zero detector 106 provides an output therefrom when no input signal is applied thereto. The output terminal of the zero detector 106 is coupled to an integrator, trigger, and differentiator circuit 108 which provides an output which is delayed from an input signal applied thereto. This output pulse is coupled to the reset terminal R of the flip-flop 88 and also to the input terminal of a delay-flop 110. The set output terminal of the delay-flop 110 provides a signal at its output for a short interval which is coupled to actuate the pawl actuator 75. Upon actuation, the pawl actuator 75 actuates the pawl 72 so that the pawl 72 is engaged between the teeth of the rack 68. The "0" output terminal of the flip-flop 88 is coupled to one input of a two-input "and" gate 112. The output of the differentiator 108 is further coupled by means of a buffer 114 to the set input terminal of a resettable delay-flop 116. A signal is present at the output terminal of the resettable delay-flop 116 when no signal has been applied at its input terminal for a previous predetermined period. The output of the resettable delay-flop 116 is coupled to the second input of the "and" gate 112.

Alternating current is applied via the lines **42*a* which is connected to operate the drum motors 115, 117 which drive the drums 44 and 46, respectively. The drum motors 115, 117, respectively, operate speed sensers 118, 120 which, when the drums 44 and 46 are rotating at full speed, actuate respective associated switches 122 and 124 for providing output signals therefrom on the lines 42*b*. Alternating current from the lines 42*b* is connected to a timer 126 which, after a fixed interval, actuates its associated switches 128. Direct current is applied via the D.C. bus 38 to the arm of the upper switch of the switches 128. The normally closed contact of the upper switch is coupled via a buffer 130 to the set input terminal S of the flip-flop 88. The normally open contact of the upper switch is connected via a differentiator 132, through a buffer 134, to the input terminal of the delay-flop 94. The output of the gate 112 is connected to the arm of the center switch of the set of switches 128. The central switch contact is connected to a Flying Head Switch SW–1 which, when the heads 73, 74 are flying, completes a circuit onto the output line 20 to provide a "unit ready" signal to the control circuit 12. Alternating current, by means of the bus 36, is connected to the arm of the lower switch of the set of switches 128. The bottom switch contact is connected via a pair of switches Crash Switch Left SW–1 and Crash Switch Right SW–1 to an enabling terminal of the carriage motor 82. The Flying Head Switch SW–1, when the head is not flying, couples a circuit from the output of the gate 112 through the middle switch of the set of switches 128 to a Landing Strip Switch SW–1 which is closed when the carriage 70 is at a landing strip. The Landing Strip Switch SW–1 is connected by means of a buffer 136 to one input of a gate 138**.

The purpose of the landing strip is described in greater detail hereinafter. The function and purpose of the landing strip is described and claimed in a copending application assigned to the present assignee and filed by Herbert F. Welsh, S.N. 24,950, filed April 27, 1960, now Patent No. 3,200,385.

Figure 5:
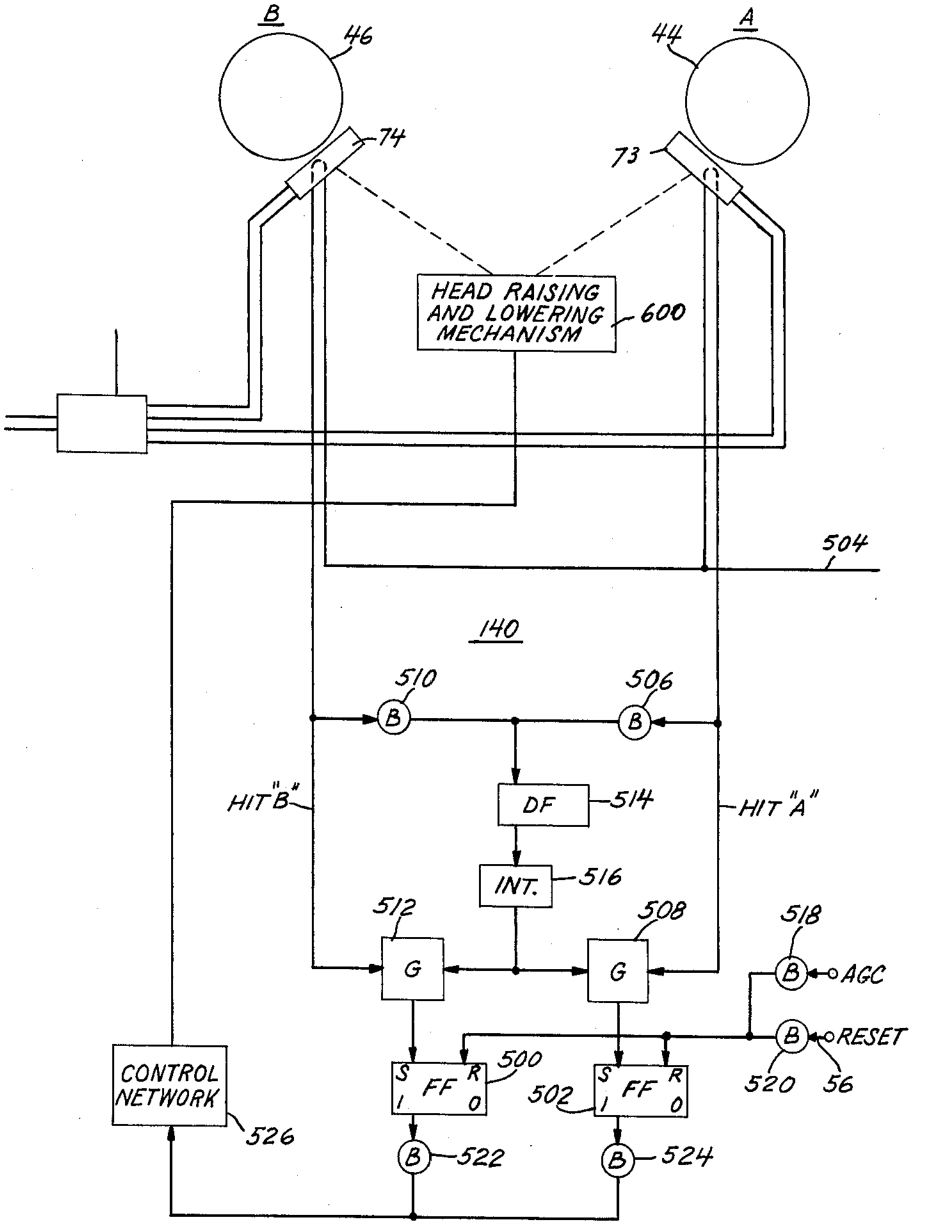
FIG. 5 is a diagram which illustrates, in greater detail, the hit detector shown in FIG. 2, and illustrates, generally, the associated circuitry coupled with the pair of drums of a drum unit shown in FIG. 1.

A hit detector 140 which detects various types of hits by the magnetic head upon the magnetic drum is illustrated in greater detail in FIGURE 5. The hit detector is described in greater detail and claimed in a copending application assigned to the present assignee and filed by Beverly L. Crew, S.N. 12,585, filed March 3, 1960.

The output of the hit detector 140 is connected to an inhibit input of the gate 138. An output is provided from the gate 138 upon the presence of a signal at one input and the absence of a signal at the inhibit input. The output of the gate 138 is connected via a pair of the switches Crash Switch Left SW–2 and Crash Switch Right SW–2 through a Raise Heads Switch 142 to one terminal of a relay coil Ry having its other terminal connected to a point of reference potential, such as ground. The relay coil Ry has associated therewith three relay poles: Ry–1, Ry–2, and Ry–3. The arm of the relay pole Ry–1 is connected to a source of direct current voltage by means of the bus 38. The normally open contact of the pole Ry–1 is coupled via a buffer 144 to the input terminal of the gate 138. As stated above, the arm of the relay pole Ry–2 is connected to a point of reference potential, such as ground. The normally closed contact of the pole Ry–2 is connected to a landing strip tap in the servo network 62. The normally open contact of the pole Ry–2 is connected to the switching circuit 60. Alternating current is supplied via the bus 36 to the arm of the pole Ry–3, whose normally open contact is connected to a bail motor and bail solenoid (not shown).

The output of the differentiator 58, via the line 56, in addition to being connected to the reset terminals of the registers 52 and 54, is connected through a buffer 146 to the set terminal S of the flip-flop 88. The signal on the drum unit selector-addressing line 16, in addition to the connections, described above, to the gates 48 and 50 and the comparator 84, is connected to a differentiator 148. The output of the differentiator 148 is connected through a buffer 150 to the input terminal of the resettable delay-flop 116. In addition, the output of the differentiator 148 is connected through the normally open Landing Strip Switch SW–2 to a buffer 152 which is coupled to the set input terminal S of the flip-flop 88.

Referring to FIG. 3, the drum unit selector-read write line 18 is coupled to a relay coil 300 which has associated therewith a plurality of poles 300–1, 300–2, . . . 300–10. The associated poles are normally open and closed upon the application of a signal upon the line 18. The drum A–B select bus 32 is connected to the arm of the relay 300–1. The contact of the pole 300–1 is connected to one terminal of a relay coil 310, whose other terminal is connected to a point of reference potential, such as ground. The relay coil 310 has associated therewith four relay poles 310–1 through 310–4. The two wires of the trim bus 34 are coupled, respectively, to the arms of the relay poles 300–2 and 300–3. The contact of the pole 300–2 is connected to a point of reference potential, such as ground. The contact of the pole 300–3 is connected to the arm of the pole 310–1. The two leads of the sector pulse bar 28 are connected, respectively, to the arms of the poles 300–4 and 300–5. The contact of the pole 300–5 is connected to the arm of the pole 310–2. The read-write mode select bus 30 is connected to the arm of the pole 300–6, which contact is connected to a control input of a switch 320. The two leads of the write bus 26 are connected to the arms of the poles 300–7 and 300–8, which contacts are connected to the switch 320. A two-line read output from the switch 320 is connected through an amplifier 330 to the contacts of the poles 300–9 and 300–10 which arms are connected to the two-line read bus 24. The switch 320 is connected to the arms of the poles 310–3 and 310–4. The normally closed contacts of the poles 310–3 and 310–4 complete a circuit through the read-write head A. The normally open contacts of these poles 310–3, 310–4 complete a circuit through the read-write head B. The normally closed contact of the pole 310–2 and the contact of the pole 300–4 complete a circuit through the sector pulse head A; the normally open contact of the pole 310–2 and the contact of the pole 300–4 complete a circuit through the sector pulse head B. The normally closed contact of the pole 310–1 completes a circuit to ground through the trim head A; the normally open contact of the pole 310–1 completes a circuit to ground through the trim head B.

Each of the drum units 14 contains two drums 44, 46 (A and B) which are mounted horizontally in an over and under configuration. Each drum contains two thousand tracks of information and each track is further subdivided into twenty-six sectors. Specific examples of storage, capacity, access time, etc. are set forth hereinafter. Various engineering embodiments can be made without departing from the spirit of this invention.

A magnetic read-write head 73, 74 is provided for each drum 44, 46. This head contains a single element (e.g. read-write head A) which is used for both reading and writing, and a pair of small elements (e.g. trim head A) called trim elements located ahead, with respect to drum motion, and to either side of the read-write element. The function of the trim elements is to erase, just prior to writing, a small band on either side of and slightly overlapping the track of the main read-write element. This is done so that, even when the head, during a writing operation, is not exactly centered over a track previously recorded, no unwanted information remains at the edges of the track to cause erroneous information in a subsequent reading operation.

In the reading operation, a read-write head is connected through the switch 320 to the read amplifier 330 which is coupled, by way of the poles 300–9 and 300–10, to the read bus 24. In the writing operation, the head is connected by way of the switch 320, via the poles 300–7 and 300–8, to receive signals from the write bus 26. Electronic switching in the switch 320 accomplishes this transfer rapidly and in response to a control signal appearing on the lead 30.

The heads 73, 74 are air-floated on the drum surface to provide extremely small stable head-drum clearance.

Both heads are supported and moved to the desired information track by a common positioning mechanism 600. The positioning mechanism 600 (FIG. 6) includes the movable carriage 70 which is approximately positioned by a drive cable 76 and pulley arrangement 78, 80 driven by a closed loop electronic servo network 62. Precision in the final positioning of the carriage 70 (and the heads 73, 74) is obtained by making use of the notched (saw-toothed) positioning bar or rack 68 which extends the full length of carriage travel. The notches on the rack 68, coacting with the mechanical pawl 72 on the carriage 70, determine the final position. The high density of the track positions and a possible servo system error make it impractical to provide a notch for each track position. Instead, the rack has one notch for every *n* position. The number of positions *n* can be any suitable number desired. In one embodiment of this invention *n* is equal to ten; in another embodiment of this invention *n* is equal to twenty. The rack 68 is moved to any intermediate position desired which is accomplished by means of solenoid actuated levers termed a lever adder 66, the output of which is a mechanical displacement equal to the sum of the individual lever movements.

*Addressing*

Where each drum has one thousand tracks, three decimal digits are desired to specify an address. Where each drum has two thousand tracks, two decimal and one vigesimal digit are used to specify an address. These decimal digits are presented to the drum unit 14 in a four-bit code. The vigesimal digits are presented to the drum unit 14 in a five-bit code and are sent from the control circuit 12 over the twelve (for 1,000 tracks) or thirteen (for 2,000 tracks) wire address bus 22 into which all the drum units 14*a*, 14*b*, . . . 14*j* are connected. Individual drum unit selector-addressing wires 16 are connected from the control circuit to each drum 14*a*, 14*b*, . . . 14*j*.

At the same time that the control circuit 12 sends out a new address over the address bus 22, it also energizes one of the drum unit selector wires 16, thus enabling only the chosen drum unit 14 to receive the new address information. In one embodiment, the duration of both the address signal and the drum unit selector signal is approximately 15 ms.

The registers 52 and 54 serve as a memory for the address.

Figures 4, 6:
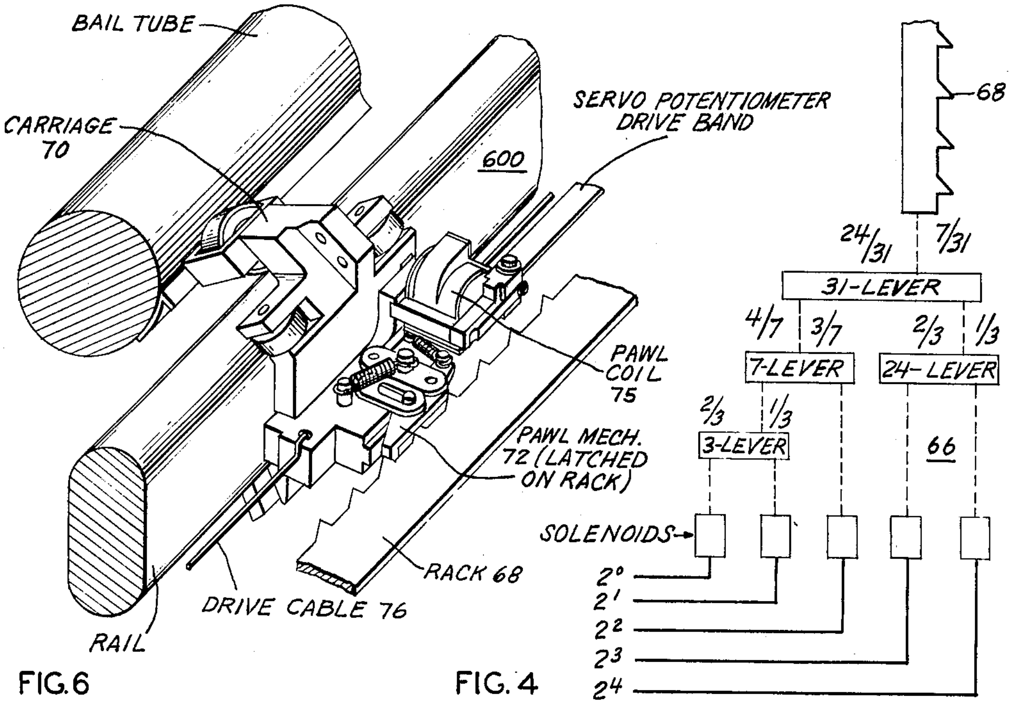
FIG. 4 is an illustrative diagram of a lever adder shown in FIG. 2.
FIG. 6 is a mechanical diagram which illustrates, in greater detail, the rack and carriage mechanism illustrated, generally, in FIG. 2.

As mentioned previously, positioning generally consists of two phases: one is the positioning of the carriage to the desired one of the one hundred teeth on the rack 68; the other is to move the rack 68 to one of the *n* (ten or twenty) positions into which a tooth is divided. The register 52 which stores the third or least significant digit energizes solenoids which actuate the lever adder 66, as shown in FIG. 4. The register 52 is connected to the digital-to-analog converter 64 which is connected to the servo network 62 to provide a voltage signal to compensate for the physical displacement of the rack 68.

Figure 7:
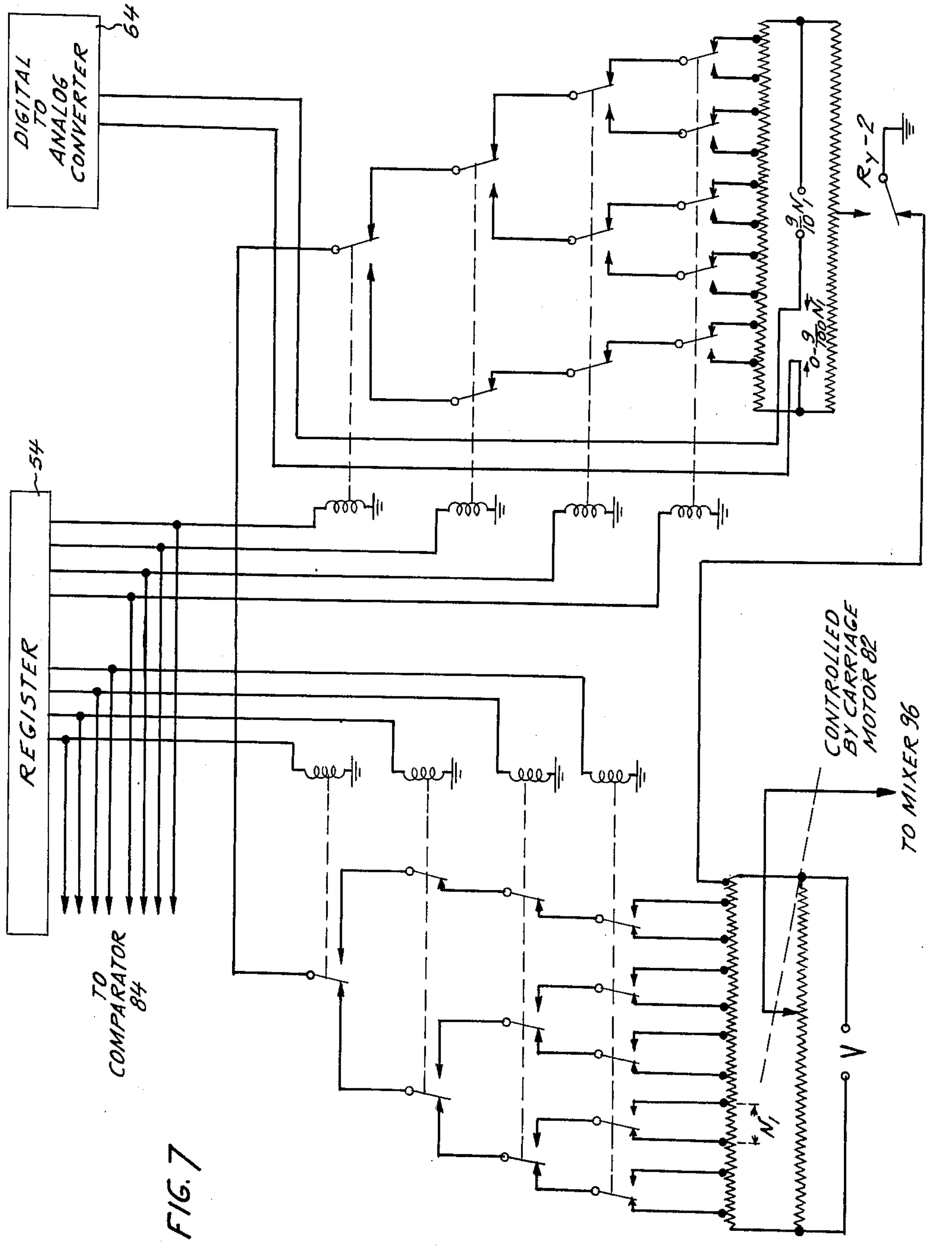
FIG. 7 is a diagram which illustrates, in greater detail, the switching circuit and servo network illustrated generally in FIG. 2.

The register 54 provides two output signals, on four lines each: a most significant decimal digit output signal, and a least significant decimal digit signal. The most significant decimal digit signal is coupled to the switching circuit 60 which, by means of a relay tree, produces ten output wires which are coupled to taps on a set of resistors which shunt a main positioning potentiometer (FIG. 7) in the servo network 62. A voltage source is connected across the potentiometer. The stem of the relay tree is connected to the stem of a second relay tree. This second relay tree is coupled to receive the least significant decimal digit signal from the register 54. The ten outputs of this second relay tree are connected to ten equally spaced taps on a second potentiometer across which is a voltage corresponding to the voltage between adjacent taps on the main potentiometer. The mid-point of the second potentiometer is coupled to a point of reference potential, such as ground, and, in this manner, the wiper arm of the main potentiometer can be made to seek any one of a hundred different positions. The error signal, which is a function of the displacement of the wiper arm from null and therefore a function of the distance that the carriage is located from its final desired position, is fed into the mixer 96, through the normally open contact of the pole 102, to drive the amplifier 104 which supplies power to one phase of the two-phase servo motor 82.

When the servo system is not positioning, the amplifier 104 output is of such phase or polarity as to apply a torque to the servo motor 82 which forces the pawl 72 on the carriage 70 back against the perpendicular face of a tooth on the rack 68. When positioning to a new address, several events happen in sequence: First, the pawl is retracted, which is caused by moving the carriage forward to drive the pawl up the incline of a sawtooth on the rack 68 to throw it over its mechanical center. This forward motion is achieved by applying, for a short period, a steady state signal to the mixer 96 of sufficient amplitude and of proper polarity to override any error signal which may be present. Subsequently, the steady state signal is removed, permitting the error signal to cause the carriage to servo to its desired position, within an accuracy of one tooth pitch. The pawl 72 is dropped electrically by means of the actuator 75. Finally, the servo amplifier 104 is disconnected from the error signal by the deactuation of the relay pole 102 and connected to a signal of such phase for causing the servo motor to bias the carriage against the perpendicular face of the tooth. The delay element 98 insures that the pawl is retracted prior to moving the carriage to a new location. As shown in FIG. 2, the "not-equal" signal from the flip-flop 88 is applied to the mixer 96, overriding any error signal which may be present from the servo network 62, *prior* to the actuation of the relay pole 100, which actuates the pole 102. The delay element 98 therefore provides that the carriage motor will act to retract the pawl prior to its servo action in locating a new address.

In general a new address usually calls for action by both the servo system and the lever adder. However, when the new address differs from the old address only in the units digit (i.e. the four or five lines of the address bus 22 which is connected to the gate 48), there is no need to use the servo system and considerable time is saved by not using the servo system. Thus, when a new address is received, the comparator 84 is probed to determine whether the register 54 has changed its state. If so, the comparator output lead (labelled ≠) generates a signal which indicates that the new carriage address is not equal to the previous carriage address. This output signal sets the flip-flop 88.

Assuming that the carriage address is the same as the previous carriage address, there is described hereinbelow a cycle of operation. The flip-flop 88 is in its reset state at the conclusion of the previous cycle. The servo output of the flip-flop 88 applies a permissive signal on the "and" gate 112. The drum unit selector signal on the line 16 is differentiated by the differentiator 148, and by way of the buffer 150, has its leading edge trigger the resettable delay-flop 116 for a period of 100 ms. This operation removes the permissive signal by the resettable delay-flop 116 to the "and" gate 112, thus terminating the output from the gate 112, which output previously was signifying, via the line 20, that this particular drum unit was ready for use by the computer 10. The action of the resettable delay-flop 116 delays the "unit ready" signal to permit the lever adder 66 to come to equilibrium after being actuated. The lever adder 66 takes approximately 80 ms. to come to rest. Upon the recovery of the resettable delay-flop 116, after 100 ms., its permissive signal is again present at the gate 112 to thereby provide an output therefrom. The output of the gate 112 is coupled through the middle switch of the set of switches 128 which is associated with the timer 126 (which assures that the drums 44 and 46 are up to speed), through the lower contact of the Flying Head Switch SW–1 which signifies that the heads are flying, and hence via the unit ready line 20 to inform the control circuit 12 that this particular drum unit 14 is ready for reading or writing. This operation assumes that the heads have already been lowered, the drums are up to speed, and that normal addressing operations are taking place. The description of initial starting is given hereinbelow.

When either of the two most significant decimal digits of a new address differs from the old address, the output of the comparator 84 provides a signal via the buffer 86 to set the flip-flop 88. In addition, the drum unit selector-addressing signal on the line 16 sets the resettable delay-flop 116 via the differentiator 148 and buffer 150. The setting of the flip-flop 88 does two things: through the delay 98, the relay coil 100 is energized which transfers the arm of the relay pole 102, thereby disconnecting the amplifier 104 from the reverse torque voltage $V_R$ which removes the reverse torque from the carriage motor 82 and connects the amplifier 104 to the output of the mixer 96. The set output of the flip-flop 88, through the differentiator 90 and buffer 92 sets the delay-flop 94 which applies a voltage to the mixer 96 for a period of 25 ms. of such polarity as to drive the carriage 70 forward and lift the pawl 72 over its mechanical center. When this signal from the delay-flop 94 disappears after 25 ms., the mixer 96 remains connected to the error signal from the servo network 62 and the servo system seeks its null. An output from one of the stages of the amplifier 104 is fed through the rectifier and zero detector 106 which produces an output when the rectified amplifier output is within limited bounds of zero. Since there may be spurious zero signals, perhaps due to under-dampening of the servo system, the output of the zero detector 106 is fed into the integrator 108 with a 50 ms. time constant which assures that the carriage 70 has come to a rest. The integrator is connected to a trigger circuit and differentiator, shown at 108, the output of which causes the pawl actuator 75 to be energized by means of the delay-flop 110, thus lowering the pawl 72 between a pair of teeth on the rack 68. The output of the integrator-trigger circuit 108 resets the flip-flop 88 which removes power from the relay coil 100, reversing the arm of the pole 102, causing the amplifier 104 to again be connected to the $V_R$ voltage source which produces a reverse torque in the carriage motor 82. The pawl actuator 75 is energized for a sufficient length of time to ensure that the carriage has been backed up to such a degree where the pawl is mechanically stable in a lowered position. The output of the integrator-trigger circuit 108, via the buffer 114, triggers the resettable delay-flop 116 for another 100 ms. to assure that the pawl 72 is safely against the perpendicular face of a tooth on the rack 68 and that all vibrations have been eliminated prior to the sending of a "unit ready" signal back to the control circuit 12 via the line 20. Thus, the flip-flop 88 has been reset, and when the resettable delay-flop 116 recovers, a "unit ready" signal is given which takes the same path as described previously.

The flip-flop 88 is a slow acting circuit so that, when the flip-flop 88 is reset at the same time as the resettable delay-flop 116 is set, no voltage spike is present from the gate 112. In other words, the rise of the reset output of the flip-flop 88 is delayed from the reset input.

*Initial start*

Assuming that all power is off, the drums are stopped, and the heads are lifted (which is automatically accomplished whenever power is removed), the carriage may be at any point along the drum and the pawl may be either raised or lowered.

In addition to the information tracks on each of the drums 44, 46, each drum contains, at one end thereto and some distance away from the information tracks, an additional track which is termed the "landing strip." In normal operation, the heads 73, 74 can be lowered only when the carriage 70 is at the landing strip, in order to avoid the risk of damage to the drum surface and to the information stored thereon, which otherwise would be inherent in the lowering of the heads. Consequently, one purpose of the starting procedure is to position the carriage 70 to the landing strip and then lower the heads into a "flying" position.

On the main potentiometer in the servo network 62, described above, there is an additional tap corresponding to the position of the landing strip. The relay pole Ry–2 (FIG. 2) switches between this landing strip tap and the switching circuit 60 to which the servo network 62 is normally connected. When the relay Ry is de-energized, the servo system when active seeks the landing strip; when the relay Ry is energized, the servo system seeks whatever address is stored in the registers 52, 54.

It is important that the drums 44, 46 be up to desired speed, both from the point of view of successfully flying the heads and because constant speed is desired for the timing circuits that are employed by the drum units 14. This speed control is achieved by a regulated and monitored line voltage and frequency and by waiting a sufficient length of time after starting to insure that the drums are at full speed. A speed sensing element 118, 120 is utilized on each drum 44, 46 to give an indication when the drum is approximately (i.e. 90%) up to speed. These speed sensors 118, 120, when sensing the proper speed, trigger a timer 126 which permits another minute or so for full speed to be achieved. Each of the two drums 44, 46 in a unit 14 is independently motor driven by the motors 115, 117 and contains its own speed sensor 118, 120. Both drums 44, 46 in a unit 14 start together but, to avoid heavy line surges, the individual units **14*a*, 14*b* . . . 14*j*** start sequentially as the previous unit reaches 90% of full speed.

Alternating current can be turned on at either the control unit 12 or the main computer 10, as desired. The alternating current is connected to the first drum unit via the A.C. bus 36, which starts the drum motors 115, 117 in that drum unit **14*a*. It also turns on various heaters and blowers (not shown) and, after a suitable delay, direct current is applied via the D.C. busses 38. An alternating current line, for example, the line 42*a*, is coupled through the contacts 124, 122, which are controlled by the two speed sensors 120, 118 in the drum unit 14*a*. When both drums 44, 46 have reached 90% of their desired speed, these contacts 124, 122 close, sending alternating current via the lines 42*b* to conductors in the next drum unit 14*b*, thus causing its motors to start. The closing of the contacts 124, 122 also applies alternating current to a timer 126 in the first drum unit 14*a*, which waits for the drums to reach full operating speed. In the meantime, direct current is applied to the system before the timer 126 completes its time delay and picks up its associated switches 128**.

When direct current comes on, it turns on the various flip-flops and delay-flops and it is desired that some of these flip-flops come on in a predetermined state. Therefore, one side of the grid returns (or the equivalent, if transistorized) of the flip-flops 88, 500, 502 is connected to direct current through the upper contact of the upper switch 128 associated with the timer 126. This assures that these flip-flops 88, 500, 502 are always turned on in the desired state. The line, marked AGC (Automatic General Clear), shown coming from the upper contact of the upper switch in the timer relay 128, is coupled to set the flip-flop 88 via the buffer 130. The signal on the AGC line is coupled, further, via a buffer 518 to reset the flip-flop 500, 502 associated with the hit detector 140.

Since it is desired that alternating current not be applied to the carriage motor 82 until the system is ready, the alternating current likewise is coupled through one of the switches (lower switch) of timer relay 128.

When the timer 126 actuates its relay, indicating that both the drums 44, 46 are up to speed, the Automatic General Clear signal is removed, unjamming the flip-flops 88, 500, 502 and alternating current now becomes available for the servo system. In addition, direct current is coupled through the lower contact of the upper switch in the timer relay 128 to produce a pulse, via the differentiator 132 and the buffer 134, to trigger the delay flop 94. The output of the delay flop 94 supplies forward torque to the servo by means of the mixer 96, the pole 102, and amplifier 104. Since the flip-flop 88 had been jammed by the Automatic General Clear signal to its "1" set state, the servo system goes through the usual steps in seeking a new address, except, however, the relay Ry has not yet been energized, thereby causing the servo network to be connected to the landing strip tap of the main potentiometer instead of to the switching circuit 60. Thus the carriage 70 seeks the landing strip track. When the carriage 70 arrives at the landing strip track, the sequence of events described previously for a normal carriage address takes place. Eventually, a signal is generated by the gate 112, which passes through the center switch 128 of the timer 126, through the upper contact of the Flying Head Switch SW–1 since the heads have not yet been lowered. The signal now passes through the Landing Strip Switch SW–1 which is positioned opposite the landing strip and is actuated by the carriage 70, thus giving physical proof that the carriage 70 is actually at the landing strip. The signal continues through the buffer 136, the gate 138 and, via the Crash Switches Left and Right SW–2 and the Raise Head Switch 142, to pick up or energize the relay Ry. After the relay Ry is initially energized, it is self-holding due to the relay pole Ry–1 and the buffer 144. The energization of the relay Ry also actuates the pole Ry–2 which transfers the servo network from the landing strip to the switching circuit 60 and, in addition, actuates the pole Ry–3 which permits alternating current on the bus 36 to energize the bail motor and bail solenoid, enabling the heads 44, 46 to lower. When the heads 44, 46 are lowered, the Flying Head Switch SW–1 is actuated, which transfers the signal from the gate 112 to its lower contact and, hence, to the control unit 12 via the unit ready line 20, thereby indicating that the drum unit 14 is ready to receive an address.

*Manual switches*

*Clear Switch SW–1—General Clear.*—The clear switch SW–1 is an on-locking switch which generates a pulse via the D.C. bus 38 and differentiator 58 onto the line 56 which resets the flip-flops 500, 502 and puts the flip-flop 88 in its set state. It also resets the registers 52, 54. Should the clear switch SW–1 be operated during normal operation, the carriage 70 moves to the track location 0000 and remains there with the heads 73, 74 flying until further instructions are received by the control circuit 12. Should "General Clear" be operated after an abnormal event, which would have raised the heads, the carriage 70 seeks the landing strip and, barring a failure, when it gets there, lowers the heads as in the initial starting routine.

*Raise Heads Switch 142.*—The Raise Heads Switch 142 is a locking type switch, shown at the bottom of FIG. 2, in series with the coil of the relay Ry. Activation of this switch immediately raises both heads 73, 74 by dropping out the relay Ry, thereby cutting power to the bail solenoid and bail motor. When the Raise Heads Switch 142 is activated (opened) while the carriage 70 is in transit between addresses, the carriage 70 returns to the landing strip. The heads 73, 74 are not lowered until the Raise Heads Switch 142 is returned to its normal position. If the switch is opened when the carriage 70 is at rest, the heads lift but the carriage remains motionless. Returning the Raise Heads Switch 142 to normal (closed) does not lower the heads and the carriage 70 remains in the same position. The operation of the Clear Switch SW–1 brings the carriage 70 to the landing strip and lowers the heads 73, 74.

*Interlock Switch.*—An Interlock Switch (not illustrated) can be provided for disconnecting the drum unit 14*a* from the line of the other drum circuits 14*b* . . . 14*j*; so that the drum unit can be serviced without interfering with the operation of the other drum units.

*Errors and failures*

*Hits.*—Referring to FIG. 5, there is shown a voltage line 504, from a positive potential source +V, having two branches. One branch of the line 504 is coupled through the head 73 to a buffer 506 and to one input of a two-input "and" gate 508. The other branch of the line 504 is coupled through the head 74 to a buffer 510 and to one input of a second two-input "and" gate 512. The outputs of the buffers 506, 510 are coupled together to the set input of a delay-flop 514. The "set" output of the delay-flop 514 is integrated by an integrator 516. The output of the integrator 516 is connected to the second inputs, respectively, of the gates 508, 512. The output of the gate 508 is connected to the set input of the flip-flop 502. The output of the gate 512 is connected to the set input of the flip-flop 500. The Automatic General Clear signal on the AGC line and the General Clear signal on the line 56 are coupled together through buffers 518, 520, respectively, to the reset inputs of the flip-flops 500, 502. The "1" output terminals of the flip-flops 500, 502 are connected through respective buffers 522, 524 to the control network 526 (which includes the gate 138, associated switches and the relay Ry of FIG. 2) which controls the head raising and lowering mechanism 600.

The contact of a head with its drum is termed a "hit." Hits can be of three types:

(1) Very short, non-repeated contacts.

(2) Very short contacts which, however, are repeated periodically; e.g. once per revolution.

(3) Long contacts which are defined to be contacts ¾ ms. or longer in duration.

The first category of hits can be ignored. However, it is desired to raise the heads 73, 74 when either the second or third type of hits occur. The hit detection network is shown in FIG. 5. Normally, the positive potential on the line 504 is transmitted via the heads 73, 74 to the hit detector network 140 to provide non-enabling voltage levels to the buffers 506, 510 and the gates 508, 512. When a head 73 or 74 hits a drum, the voltage level on the Hit "A" or Hit "B" line, respectively, is grounded, to provide an enabling signal to its respective buffer 506 or 510 and the gates 508 or 512. Thus, hits from either the drum A or the drum B (which are detected by the grounding of the head) are buffed together to trigger the delay-flop 514 for a period of 75 ms. The 75 ms. period is just slightly longer than a period of one drum revolution. The set output of the delay-flop 514 is coupled through an integrator 516 which takes ¾ ms. to build up a voltage sufficient to open the gates 508, 512. The "Hit A" line is connected to the buffer 506 and the gate 508; the "Hit B" line is connected to the buffer 510 and the gate 512. Thus, when the duration of the contact (hit) is less than ¾ ms., the signal does not get through the gate 508, 512. When, however, the hit exceeds ¾ ms. in duration, the latter portion of the hit passes through the gate 508, 512 to set its respective flip-flop 502, 500. Likewise, when the hit, though of short duration, is repeated during the 75 ms. period of the delay flop 514, it also passes through the gate 508, 512 to set its respective flip-flop 502, 500. The outputs of the flip-flop 500, 502 are buffed together through buffers 522 and 524 and connected as an inhibitory input to the gate 138 (FIG. 2) which supplies power for the relay Ry. The presence of a hit signal to the inhibitory input of the gate 138 blocks the gate, dropping out the relay Ry, and thereby raising the heads 73, 74. Should a significant hit occur while the carriage 70 is at rest, the heads 73, 74 raise, but the carriage 70 does not move, thus providing the opportunity to visually inspect the drum in the area where the carriage is presently located. Should the hit occur while the carriage 70 is in transit, the heads 73, 74 raise and the carriage 70 returns to the landing strip. In any event, in order to lower the heads 73, 74, the Clear Switch SW–1 should be actuated, thereby causing the carriage 70 to move to the landing strip, if not already there, and causing the heads 73, 74 to lower, placing the heads in a flying position.

*Carriage Over-Travel.*—Failure in the servo system or failure to drop the pawl 72 when required may result in the driving of the carriage 70 to the end of the rack 68. "Crash" springs (not shown), which can safely cushion the worst possible impact, are provided at each end of the rack 68 to provide for this contingency. Miniature switches, Crash Switch Left SW–1 and Crash Switch Right SW–1, are provided at each end of the rack 68 to cut power to the motor 82. Contacts of these switches are shown coupled to the lower switches of the set of switches 128 (FIG. 2). Another pair of poles of these switches (or separate switches), Crash Switch Left SW–2 and Crash Switch Right SW–2, are shown in the line to the coil of the relay Ry so that if a "crash" occurs, although the heads 73, 74 are mechanically forced up by a cam arrangement, power to the bail motor and bail solenoid is removed. These crash miniature switches are mechanically locking and are manually reset. Following a crash, the switches are reset and a general clear signal is given by the actuation of the clear switch SW–1. The carriage is then moved to the landing strip where, during normal operation, the heads are lowered and the Unit Ready signal is sent back to the control unit.

*Reading Errors.*—All information coming from the drum is parity checked in the control circuit 12. The procedure to be followed in case of a parity error is a part of the computer program.

*Addressing Errors.*—Preceding each sector of information on the drum is a six decimal digit address which specifies the number of the drum unit, the track address, and whether upper or lower drum 44, 46. These complete sector addresses are checked by the control circuit 12 before either a reading or writing operation takes place, and if the servo system has failed to position the carriage 70 to the proper track or if the wrong drum unit 14 or drum 44, 46 has been selected, the control circuit 12 detects this error and causes alternative action to be taken under a program control.

Other circuits (not shown) detect power failure and overheating.

There is shown, in FIG. 2, the Landing Strip Switch SW–2 which receives, via the differentiator 148, a signal from the drum unit selector (addressing) line 16, and transmits that signal via the buffer 152 to set the flip-flop 88. The purpose for this is as follows: a "clear" signal on the line 56 clears the relay registers 52 and 54 to 000 and normally brings the carriage 70 to the landing strip. If the address which the computer 10 wishes to use is 000, then, when this address is sent to the drum unit 14, there is no change in the comparator 84 output and no signal is given on the $\neq$ line to set the flip-flop 88. Consequently, the carriage 70 would not move from the landing strip but for the fact that, in this circumstance, the drum unit selector signal is buffed to set the flip-flop 88 when the carriage is in the landing strip.

*Reading and writing*

The control circuit 12 can select any drum unit 14, for reading or writing, from which it is receiving a "unit ready" signal. The control circuit 12 selects the desired unit 14 by sending a signal to it over a selector wire 18, termed drum unit selector (read-write). This signal picks up and holds a relay coil 300 in the drum unit 14 which connects the read lines 24, write lines 26, sector pulse lines 28, and trim lines 34 to the corresponding busses going to the control circuit 12. Concurrently, the control circuit 12 elects the upper (A) or lower (B) drum. This selection is performed by means of the drum A–B select bus 32 which operates the relay 310, in the drum unit selected, to actuate on the A heads (read-write, sector pulse, and trim) when the relay 310 is unenergized, or the B heads when energized.

The appropriate read-write head is connected to the Read-Write Switch 320 (which is a solid state device controlled by a signal from the read-write mode select bus 30). This switch 320 connects the head to the read amplifier 330 and hence to the read bus 24 in the absence of a control signal on the line 30, and to the write bus 26 in the presence of a signal on the line 30.

When a read order is impending, information can be utilized by the control circuit 12 as soon as the complete sector address is identified. However, when a write order is incipient, trim current should be turned on substantially before information is sent to the head and the head switched to write. (This is due to the slow rise desired for the trim current and due to the physical displacement of the trim heads from the read-write head.) Trim current is turned on as soon as the correctness of the unit number, drum, and track is verified, but writing does not start until the complete address is verified. Should the sector to be written appear immediately after the read-write head is connected, there is not sufficient time to get the trim current established prior to the starting of the writing operation, and writing in this one particular case is deferred for one revolution. A systematic process which takes care of this contingency is to first make a partial comparison for unit, drum, and track, then turn on trim current, and after trim current is safely established, make a full sector address comparison and switch to a write operation. Upon completion of recording a sector, the trim current is turned off.

*Operation of the lever adder*

The lever adder 66, shown in FIGS. 2 and 4, operates as an electrical to mechanical transducer, as stated heretofore. In one embodiment of this invention, it is desired to move the rack 68 to any one of twenty incremental positions in accordance with a binary coded vigesimal digit signal applied by the register 52.

Devices for converting electrical signals into mechanical motion are well known in the art. Mechanical devices for performing addition by means of levers are known. One accurate method or means for performing the process of mechanical addition is described on page 37, vol. 27, Radiation Laboratories Series. Another accurate device is shown and described in greater detail in a co-pending application by H. F. Welsh, Serial Number 10,374, filed February 23, 1960 and assigned to the common assignee of this application.

The lever adder, shown in FIG. 4, is illustrated in a concise form in order to facilitate an understanding of this invention.

In the embodiment shown in FIG. 4, the lever adder 66 includes five separate input lines. The five lines, which together are adapted to carry binary signals indicative of integral numbers from 0 through 31, are labelled $2^0$, $2^1$, $2^2$, $2^3$, and $2^4$. Each input line is coupled to actuate a corresponding solenoid so as to move an output wire (shown in dotted lines) a fixed distance.

The $2^0$ solenoid output wire is connected to the left end (as viewed in FIG. 4) of a bar labelled 3-lever; the $2^1$ solenoid output wire is connected to the right end of the 3-lever; the $2^2$ solenoid output wire is connected to the right end of a bar labelled 7-lever; the $2^3$ solenoid output wire is connected to the left end of a 24-lever bar; and the $2^4$ solenoid output wire is connected to the right end of the 24-lever.

A wire coupled to the 3-lever, one-third of its length from the right end, is coupled to the left end of the 7-lever. A wire connects the left end of the 31-lever to a point on the 7-lever, $3/7$ of its length from the right end. A wire connects the right end of the 31-lever to a point on the 24-lever, $2/3$ of its length from its left end. The rack is coupled by a wire to a point on the 31-lever at a distance $24/31$ of its length from its left end.

Assume, for example, that the leads $2^0$, $2^1$, and $2^3$ are actuated, representing eleven. The $2^0$, $2^1$, and $2^3$ solenoids, upon actuation, move their respective output wires a fixed distance, for example, 31 units. The $2^2$ and $2^4$ solenoids are not operated.

The left and right ends of the 3-lever each move down 31 units, thereby causing the left end of the 7-lever to move down 31 units. The left end of the 24-lever moves down 31 units. Since the right end of the 7-lever remains fixed, the wire connecting to the left end of the 31-lever moves down a distance of $3/7 \times 31$ units, within the structural accuracy of the device, as shown. The right end of the 24-lever remains fixed, the wire connecting to the right end of the 31-lever moves down a distance of $1/3 \times 31$ units. The rack 68, therefore, moves a distance of $7/31 \times 3/7 \times 31 + 24/31 \times 1/3 \times 31 = 11$ units.

In such an embodiment described, the teeth on the rack 68 are placed 20 units apart, so that an input signal of $1(2^0)+1(2^1)+0(2^2)+1(2^3)+0(2^4)$ moves the rack a distance equal to $11/20$ the pitch of a tooth.

Various modifications can be made to the circuits which are within the spirit of applicant's invention. For example, other than ten drum units can be used, storage can be increased by further increasing the density, since, as described, the lever adder 66 is $^{20}/_{32}$ efficient. Without the addition of extra equipment, the storage can be increased by using the full storage capacity of the lever adder. Other modifications, such as the addition of extra levers to the lever adder, the addition of extra teeth on the rack 68, increasing the length and diameter of the drum, can be made without departing from the spirit of this invention.

What is claimed is:

1. A drum having *mn* tracks about its periphery; a head; a movable carriage for carrying said head in cooperative engagement with a track on said drum; means for receiving an electrical coded signal indicative of a desired track for engagement with said head, said signal having one portion thereof expressed in the radix *m* and and a second portion expressed in the radix *n*; a rack having *m* teeth thereon spaced equidistant from each other to form slots therein, one side of each of said teeth being perpendicular with the length of said rack to form the face of a tooth, the opposite side of each of said teeth being at a slanting angle with said length to form the incline of a tooth; a pawl carried by said carriage for engagement in the slots of said rack, said pawl being electrically actuated for engagement in said rack, said pawl being mechanically retractable by actuating said pawl up the incline of a tooth; means for applying a small force in one direction to said carriage along its length to engage said pawl against the face of one of said teeth; means responsive to said second portion of said electrical coded signal for moving said rack a total distance not exceeding the pitch of a tooth; means responsive to a successively different one portion signal for applying a force to said carriage in a direction opposite to said one direction, whereby said pawl is mechanically retracted; means responsive to said electrically coded signal, upon the response of said last named means, for moving said carriage approximately to said desired track; and means responsive to the steady state of said carriage for actuating said pawl, whereby said second named means is operative to engage said pawl against the face of a tooth, and whereby said head is in engagement with said desired track.

2. The combination as claimed in claim 1 further including means for indicating that said head is in engagement with said desired track.

3. The combination as claimed in claim 1 wherein said drum is a magnetic drum and said head is a magnetic head.

4. The combination as claimed in claim 1 further including a second drum, a second head carried by said carriage for engagement with said second drum, a circircuit, and means for switching said circuit between said first and second heads.

5. A head positioning mechanism comprising a movable carriage cooperatively connected to said head; a pawl connected to said carriage; a rack having a plurality of teeth, said pawl adapted to be engageable with said teeth; means for receiving a coded electrical signal; means responsive to a portion of said coded electrical signal for moving said rack a distance less than a pitch of a tooth; means for providing a force of one direction by said carriage against the face of a tooth; means responsive to a change of the remaining portion of said signal for applying a force of the opposite direction to said carriage to cause said carriage to move the distance of a pitch of a tooth, said pawl being retractable upon such movement whereby said pawl is retracted; means responsive to the entire electrical signal for directing the motion of said carriage to a predetermined location; and means responsive to the arrival of said carriage at said predetermined location for actuating said pawl to cooperatively engage between the teeth of said rack and for applying said first force in said one direction to bias said carriage against said rack.

6. In combination, a rack having *n* equally spaced teeth upon said rack; a magnetic drum having *mn* tracks about the periphery of said drum; a movable carriage for carrying a magnetic head in cooperative engagement with said tracks, said carriage having a pawl engageable with said rack; means for receiving a coded electrical signal for directing the movement of said carriage to one of said tracks, said coded electrical signal having a first portion in the radix *m* and a second portion in the radix *n*; means responsive to said *m* radix signal for moving said rack a total distance up to a pitch of a tooth; means for providing a force in one direction to bias said carriage via said pawl against the face of a tooth on said rack; means responsive to a change of a portion of a signal in the *n* radix for moving said carriage in a direction opposite to said one direction whereby said pawl is retracted; means responsive to said signal for moving said carriage into engagement between the teeth of said rack to the proper address; and means responsive to the movement of the carriage to said proper address to actuate said pawl between the teeth of said rack and for applying a force of said one direction via said carriage via said pawl against the face of a tooth of said rack whereby said head cooperatively engages with the track on the drum designated by said electrical signal.

7. A drum having a plurality of tracks about its periphery; a head; a movable carriage for carrying said head in cooperative engagement with a track of said drum; a rack having a plurality of teeth thereon spaced equally distant from each other to form slots therein, one side of each of said teeth being perpendicular with the length of said rack to form the face of a tooth, the opposite side of each of said teeth being at a slanting angle with said length to form the incline of a tooth; a pawl carried by said carriage for engagement in the slots of said rack; means for applying a small force to said carriage to engage said pawl against the face of one of said teeth; means responsive to a first electrical signal for moving said rack a distance not exceeding the pitch of a tooth; means responsive to a second electrical signal for moving said carriage with respect to said rack; means responsive to a change in said second electrical signal for retracting said pawl; and means responsive to the steady state of said carriage for actuating said pawl against the face of a tooth whereby said head is in engagement with the desired track in accordance with said first and second electrical signals.

8. In combination, a positioning mechanism for accurately positioning a member comprising a first device connected to said member, said first device adapted to be positioned approximately to a desired location; a second device adapted to be moved a short distance with an accuracy exceeding that of said first device; means for cooperatively engaging said first and second devices with each other whereby movement of said first device and movement of said second device act to position said member in a rough and fine adjustment respectively; means for receiving an electrical signal; means responsive to a portion of said electrical signal for moving said second device; and means responsive to said entire signal for moving said first device.

9. In combination, a support member; a carriage adapted to move longitudinally with respect to said support member; a transducer carried by said carriage; a rotatable record member having a plurality of addressable tracks thereon and adapted to be co-operatively engaged with said transducer; a rack having a plurality of teeth thereon, said rack being adapted to move parallel to the movement of said carriage, said teeth being of constant pitch and having vertical edges at one side thereof and slanting edges at the opposite sides thereof, the space between adjacent teeth forming slots; a pawl carried by said carriage adapted to be electrically actuated so as to engage in one of said slots and adapted to be mechanically retractable; means for receiving a first and a second signal; means responsive to solely said first signal for moving said rack a distance less than a pitch of a tooth; means responsive to a change in said second signal for retracting said pawl; and means responsive to both said first and second signals for moving said carriage in accordance with said signals.

References Cited by the Examiner

UNITED STATES PATENTS

| | | | |
|---|---|---|---|
| 1,559,525 | 10/1925 | Murphy | 318—3 |
| 2,698,407 | 12/1954 | Pease | 318—3 |
| 2,875,390 | 2/1959 | Tripp | 340—347.3 |
| 2,994,856 | 8/1961 | Dickinson | 340—174.1 |
| 3,009,759 | 11/1961 | Johnson | 340—174.1 |
| 3,023,404 | 2/1962 | Dickerson | 340—174.1 |
| 3,025,710 | 3/1962 | Muffley | 340—174.1 |

IRVING L. SRAGOW, *Primary Examiner.*